US012080311B2

(12) United States Patent
Engel et al.

(10) Patent No.: US 12,080,311 B2
(45) Date of Patent: *Sep. 3, 2024

(54) MACHINE-LEARNED DIFFERENTIABLE DIGITAL SIGNAL PROCESSING

(71) Applicant: Google LLC, Mountain View, CA (US)

(72) Inventors: Jesse Engel, Oakland, CA (US); Adam Roberts, Oakland, CA (US); Chenjie Gu, Sunnyvale, CA (US); Lamtharn Hantrakul, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,567

(22) Filed: Jun. 29, 2023

(65) Prior Publication Data
US 2023/0343348 A1 Oct. 26, 2023

Related U.S. Application Data

(63) Continuation of application No. 16/922,543, filed on Jul. 7, 2020, now Pat. No. 11,735,197.

(51) Int. Cl.
*G10L 19/26* (2013.01)
*G06N 3/084* (2023.01)
*G06N 20/00* (2019.01)
*G10L 25/30* (2013.01)

(52) U.S. Cl.
CPC .............. *G10L 19/26* (2013.01); *G06N 3/084* (2013.01); *G06N 20/00* (2019.01); *G10L 25/30* (2013.01)

(58) Field of Classification Search
CPC ................................. G10L 19/26; G10L 25/30
USPC .......................................................... 704/500
See application file for complete search history.

(56) References Cited

U.S. PATENT DOCUMENTS

| 2020/0312317 A1* | 10/2020 | Kothari ................. H04L 67/125 |
| 2021/0082408 A1* | 3/2021 | Shechtman ......... G10L 15/1807 |
| 2021/0319321 A1* | 10/2021 | Krishnamurthy ...... G06N 20/00 |

OTHER PUBLICATIONS

Spatial Sound Scene Synthesis and Manipulation for Virtual Reality and Audio Effects Ville Pulkki, 1 Archontis Politis, 1 Tapani Pihlajamaki, 2 and Mikko-Ville Laitinen2 (Year: 2018) (Year: 2018) (Year: 2018 (Year: 2018).*
An Optical Communication's Perspective on Machine Learning and Its Applications Faisal Nadeem Khan , Qirui Fan , Chao Lu, and Alan Pak Tao Lau (Year: 2019) (Year: 2019) (Year: 2019).*

(Continued)

*Primary Examiner* — Bharatkumar S Shah
(74) *Attorney, Agent, or Firm* — DORITY & MANNING P.A.

(57) ABSTRACT

Systems and methods of the present disclosure are directed toward digital signal processing using machine-learned differentiable digital signal processors. For example, embodiments of the present disclosure may include differentiable digital signal processors within the training loop of a machine-learned model (e.g., for gradient-based training). Advantageously, systems and methods of the present disclosure provide high quality signal processing using smaller models than prior systems, thereby reducing energy costs (e.g., storage and/or processing costs) associated with performing digital signal processing.

20 Claims, 7 Drawing Sheets

(56) References Cited

OTHER PUBLICATIONS

Digital Sound Synthesis by Physical Modelling Rudolf Rabenstein and Lutz Trautmann Telecommunications Laboratory University of Erangen-Nurnberg (Year: 2001) (Year: 2001) (Year: 2001) (Year: 2001).*
Alwahab et al, "FIR Filter Design Based Neural Networks.", Symposium on Communication Systems, Networks, and Digital Signal Processing, Jul. 2018, Budapest, Hungary, 4 pages.
Arik et al, "Fast Spectrogram Inversion using Multi-head Convolutional Neural Network.", arXiv:1808v2, Nov. 6, 2018, 6 pages.
Blaauw et al, "A Neural Parametric Singing Synthesizer Modeling Timbre and Expression from Natural Songs.", Applied Science, vol. 7, 23 pages.
Chandna et al, "WGANSing: A Multi-Voice Singing Voice Synthesizer Based on the Wasserstein-GAN.", arXiv:1903v3, Jun. 19, 2019, 5 pages.
Defossez et al, "SING: Symbol-to-Instrument Neural Generator.", Conference on Neural Information Processing System, 2018, Montreal, Canada, 11 pages.
Donahue et al, "Adversarial Audio Synthesis.", Conference on Learning Representations, May 2019, New Orleans, Louisiana, United States, 16 pages.
Engel et al, "GANSyth: Adversarial Neural Audio Synthesis.", Conference on Learning Representations, May 2019, New Orleans, Louisiana, United States, 17 pages.
Engel et al, "Neural Audio Synthesis of Musical Notes with WaveNet Autoencoders.", arXiv:1703v1, Apr. 5, 2017, 16 pages.
Esling et al, "Universal Audio Synthesizer Control with Normalizing Flows.", arXiv:1907v1, Jul. 1, 2019, 11 pages.
Flanagan et al, "Speech Analysis Synthesis and Perception.", Dec. 21, 2014, 500 pages.
Hantrakul et al, "Fast and Flexible Neural Audio Synthesis.", International Society for Music Information Retrieval, Nov. 4/8, 2019, Delft, Netherlands, pp. 524-530.
Hoffman et al, "Feature-Based Synthesis: Mapping Acoustic and Perceptual Features onto Synthesis Parameters.", Department of Computer Science, Princeton University, 4 pages.
Huang et al, "Active Learning of Intuitive Control Knobs for Synthesizers Using Gaussian Processes.", International Conference on Intelligent User Interfaces, Feb. 24-27, 2014, Haifa, Israel, 10 pages.
Kalchbrenner et al, "Efficient Neural Audio Synthesis", arXiv:1802v2, Jun. 25, 2018, 10 pages.
Khan et al, "An Optical Communication's Perspective on Machine Learning and Its Applications.", Journal of Lightwave Technology, vol. 37, No. 2, Jan. 15, 2019.
Kim et al, "Crepe: A Convolutional Representation of Pitch Estimation.", arXiv:1802v1, Feb. 17, 2018, 5 pages.
Klapuri et al, "Robust Multipitch Estimation for the Analysis and Manipulation of Polyphonic Musical Signals.", 6 pages.
Locatello et al, "Challenging Common Assumptions in the Unsupervised Learning of Disentangled Representations.", arXiv:1811v4, Jun. 18, 2019, 37 pages.
McAulay, "Speech Analysis/Synthesis Based on a Sinusoidal Representation.", Acoustics, Speech and Signal Processing, vol. 34, No. 4, Aug. 1986, 11 pages.
Mehri et al, "SampleRNN: An Unconditional End-to-End Neural Audio Generation Model.", arXiv:1612v2, Feb. 11, 2017, 11 pages.
Morise, "World: A Vocoder-Based High-Quality Speech Synthesis System for Real-Time Applications.", Transactions on Information and Systems, vol. E99, No. 7, Jul. 2016, pp. 1877-1884.
Naylor et al, "Speech Dereverberation.", 2010, 4 pages.
Oord et al, "WaveNet: A Generative Model for Raw Audio.", arXiv:1609v2, Sep. 19, 2016, 15 pages.
Pepe et al, "Designing Audio Equalization Filters by Deep Neural Networks.", Applied Sciences, vol. 10, No. 7, 21 pages.
Pulkki et al, "Spatial Sound Scene Synthesis and Manipulation for Virtual Reality and Audio Effects.", Parametric Time-Frequency Domain Spatial Audio, Institute of Electrical and Electronics Engineers, 2018, pp. 347-361.
Purnhagen et al, "HILN-the MPEG-4 Parametric Audio Coding Tools.", 4 pages.
Rabenstein et al, "Digital Sound Synthesis by Physical Modelling.", Second International Symposium on Image and Signal Processing and Analysis. In conjunction with Twenty-third International Conference on Information Technology Interfaces, Institute of Electrical and Electronics Engineers, Pula, Croatia, 2001, pp. 12-23.
Serra et al, "Spectral Modeling Synthesis." A Sound Analysis/Synthesis System Based on Deterministic Plus Stochastic Decomposition, Computer Music Journal, vol. 14, No. 4, 1990, pp. 12-24.
Wang et al, "Neural Source-Filter Waveform Models for Statistical Parametric Speech Synthesis.", arXiv:1904v2, Nov. 17, 2019, 14 pages.
Wang et al, "Tacotron: Towards End-to-End Speech Synthesis.", arXiv:1703v2, Apr. 6, 2017, 10 pages.

* cited by examiner

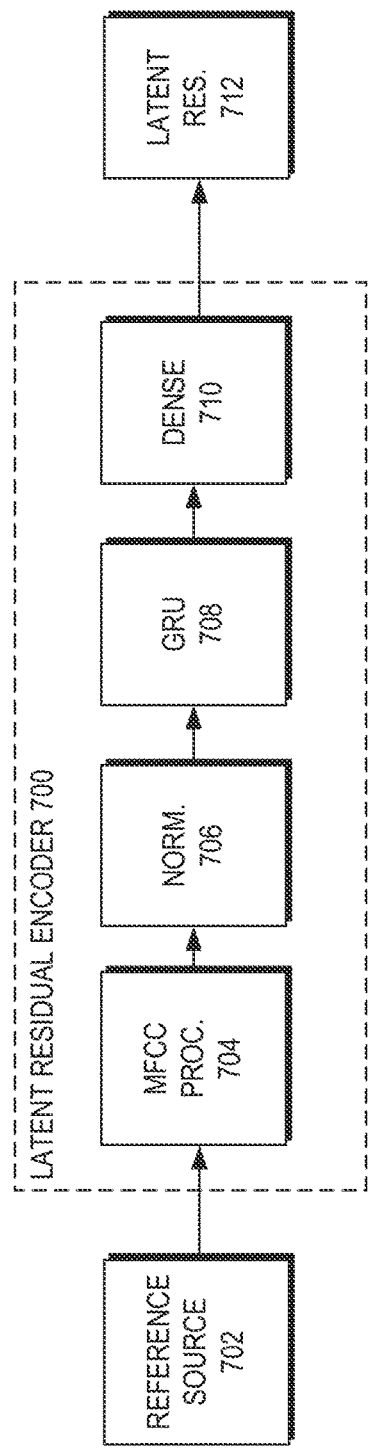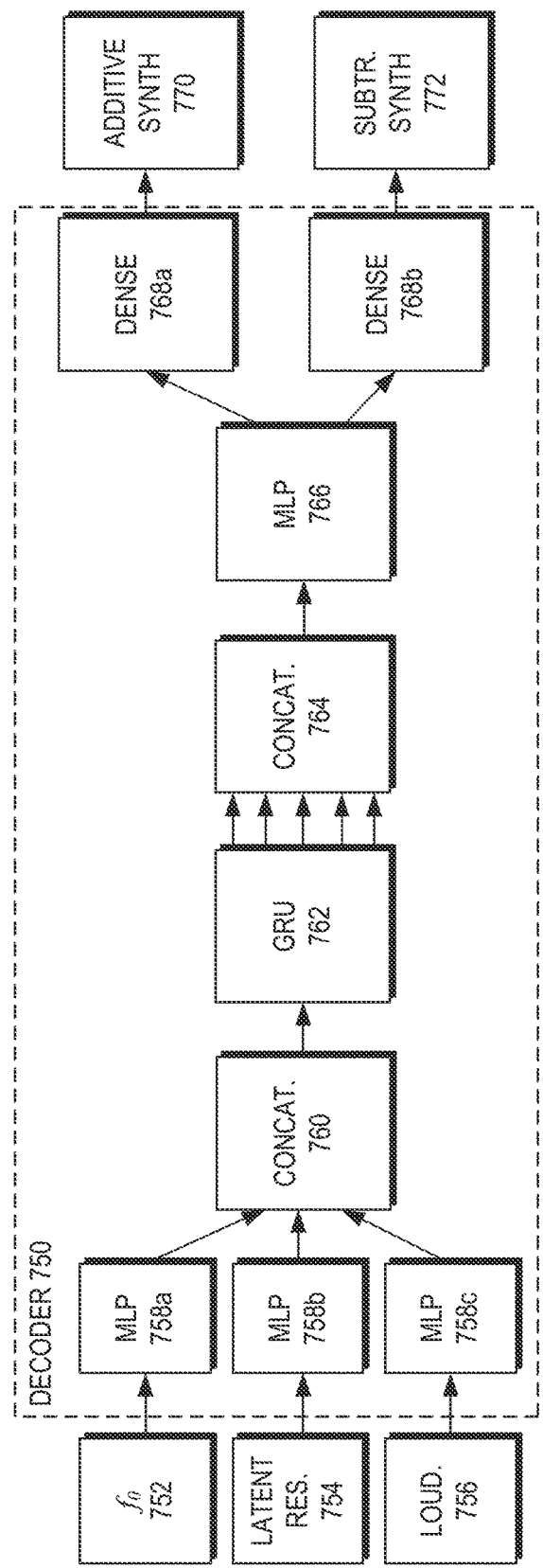
Figure 7A
Figure 7B

MACHINE-LEARNED DIFFERENTIABLE DIGITAL SIGNAL PROCESSING

PRIORITY CLAIM

The present application is a continuation of U.S. application Ser. No. 16/922,543 having a filing date of Jul. 7, 2020. The present application claims priority to and the benefit of U.S. application Ser. No. 16/922,543. U.S. application Ser. No. 16/922,543 is hereby incorporated by reference herein in its entirety.

FIELD

The present disclosure relates generally to digital signal processing. More particularly, the present disclosure relates to machine-learned differentiable digital signal processors.

BACKGROUND

Digital signals form a fundamental building block for technological devices and systems, and digital signal processing (DSP) is an essential tool for manipulating and transforming digital signals for optimal performance in varied applications. The wide-ranging applicability of DSP tools and techniques is an advantage that has prompted continued study and development in the field in the years since its introduction, and many current DSP tools have achieved excellent performance once properly adapted to a given application. However, DSP tools' broad versatility also poses significant challenges. DSP tools often have a large number of parameters, each of which may require careful selection. Developing a DSP tool for a particular application can be time and labor intensive.

Attempts have been made to replace traditional DSP elements with machine-learned models. However, such attempts have encountered new challenges, including data-intensive training requirements and model processing artifacts.

SUMMARY

Aspects and advantages of embodiments of the present disclosure will be set forth in part in the following description, or can be learned from the description, or can be learned through practice of the embodiments.

One example aspect of the present disclosure is directed to a computing system that combines machine learning with digital signal processors. The computing system includes one or more processors and one or more non-transitory computer-readable media that collectively store one or more differentiable digital signal processors configured to receive one or more control inputs and to process the one or more control inputs to generate a digital signal output, wherein each of the one or more differentiable digital signal processors is differentiable from the digital signal output to the one or more control inputs. The one or more non-transitory computer-readable media collectively store a machine-learned model configured to receive a model input and to process the model input to generate the one or more control inputs for the one or more differentiable digital signal processors, wherein the machine-learned model has been trained by backpropagating a loss through the one or more differentiable digital signal processors. The one or more non-transitory computer-readable media collectively store instructions that, when executed by the one or more processors, cause the computing system to perform operations. The operations include receiving the model input. The operations include using the machine-learned model to generate the one or more control inputs based on the model input. The operations include using the one or more differentiable digital signal processors to generate the digital signal output based on the one or more control inputs.

Another example aspect of the present disclosure is directed to a computer-implemented method for training a machine-learned model to generate control inputs for differentiable digital signal processors. The method includes inputting, by a computing system comprising one or more computing devices, a reference signal into a machine-learned model. The method includes generating, by the computing system, and with the machine-learned model, one or more control inputs for one or more differentiable digital signal processors. The method includes generating, by the computing system, a digital signal output by inputting the one or more control inputs into the one or more differentiable digital signal processors. The method includes updating, by the computing system, one or more parameter values of the machine-learned model based on a backpropagation of a loss through the one or more differentiable digital signal processors and the machine-learned model, wherein the loss is determined at least in part based on the digital signal output and the reference signal.

Another example aspect of the present disclosure is directed to a computing system for the synthesis of an output audio waveform based on an input audio waveform. The computing system includes one or more processors and one or more non-transitory computer-readable media that collectively store one or more digital signal processors for processing the input audio waveform. The non-transitory computer-readable media collectively store instructions that, when executed by the one or more processors, cause the computing system to perform operations. The operations include obtaining one or more control inputs for controlling the one or more digital signal processors, wherein the one or more control inputs include one or more latent representations of acoustic features of a reference audio source, the one or more latent representations having been generated by a machine-learned model trained by backpropagation of a loss determined by comparing a recording of the reference audio source and a synthesized recording thereof. The operations include inputting the one or more control inputs and the input audio waveform into the one or more digital signal processors. The operations include synthesizing the output audio waveform with the one or more digital signal processors.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7A depicts a block diagram of one example of an encoder for encoding a latent residual representation according to additional example embodiments of the present disclosure; and FIG. 7B depicts a block diagram of one example of a decoder for generating control inputs from one or more latent representations according to additional example embodiments of the present disclosure.

Figure 1:
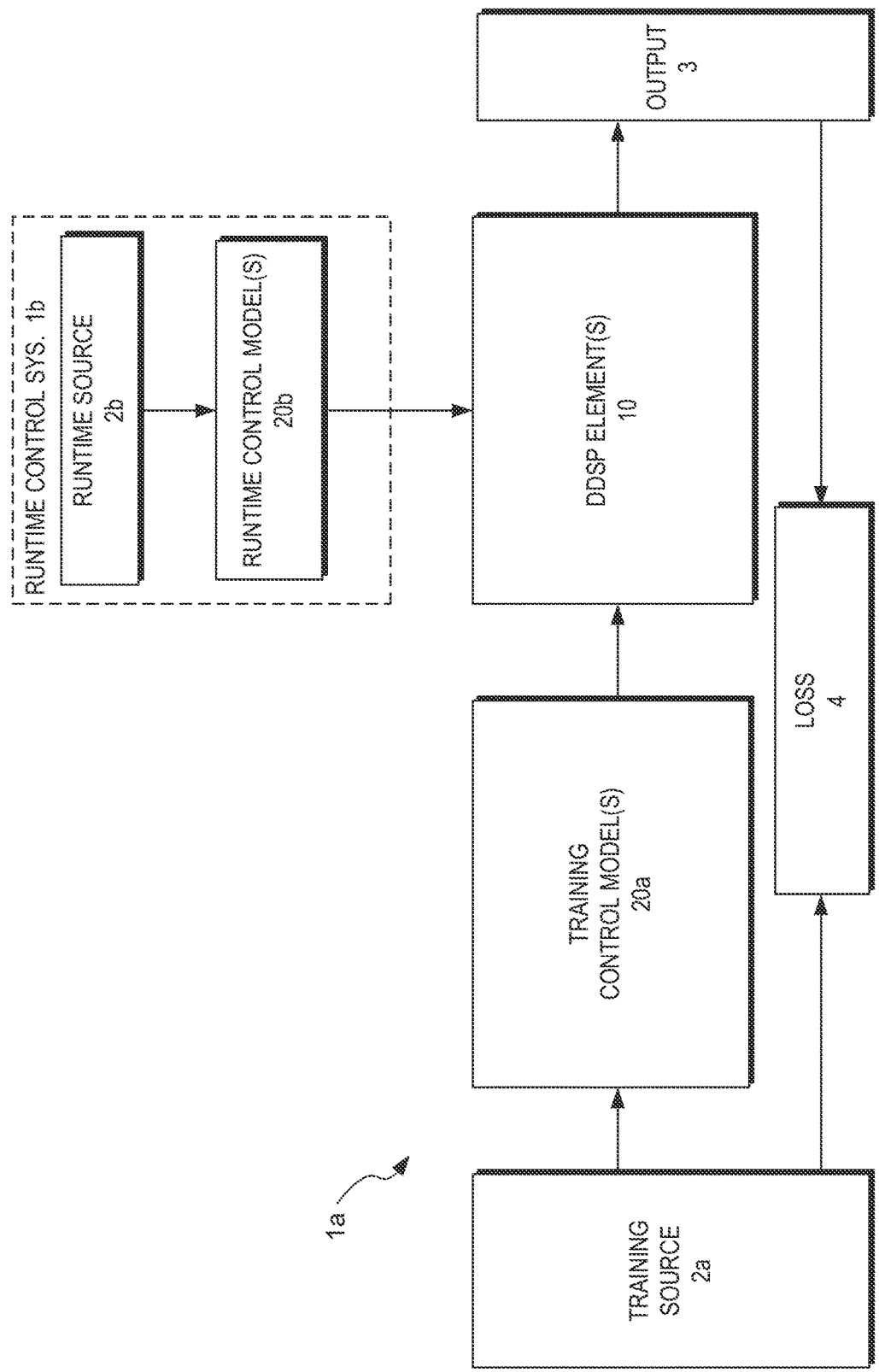
FIG. 1 depicts a block diagram of an example computing system that performs digital signal processing according to example embodiments of the present disclosure.

Reference numerals that are repeated across plural figures are intended to identify the same features in various implementations.

DETAILED DESCRIPTION

Overview

Generally, the present disclosure is directed to machine-learned differentiable digital signal processors. Advantageously, differentiable digital signal processors (DDSP) enable the full power of machine learning gradient-based training algorithms (e.g., backpropagation) to be leveraged for improved tuning of models and systems containing DSP elements. Of further advantage, systems and methods of the present disclosure offer these improvements while retaining the natural advantages, interpretability, and power of the DSP elements.

Prior techniques for applying machine learning techniques to signal processing problems have failed to recognize the advantages of incorporating or combining DSP elements into or with a machine-learned model for digital signal processing. For instance, some prior techniques have simply trained a neural network to perform "waveshaping," where the hidden layers of the neural network model simply map an input signal to a desired output signal, often without any interpretable structure for intuition based on the intrinsic characteristics of waveforms. These prior methods have demonstrated limited or narrow performance results, as the machine-learned models are generally naïve to the governing principles of the signals being processed (e.g., the physics governing dynamical systems, etc.), and may thus be prone to fail along undesirable or unnatural failure modes. For example, when dealing with oscillating signals, or waveforms, past techniques have generally processed waveforms with an inductive bias toward waveforms with aligned wave packets rather than physical oscillations, leading to signal artifacts caused by unnatural misalignment of adjacent packets. In some cases, the unnatural characteristics of failure modes are especially problematic when the signals contain information which records and/or mimics the physical world (e.g., video, audio), as the imperfections can lead to unnatural or undesirable experiences. Some attempts to resolve these issues have resulted in models which must learn extremely high numbers of filters to smoothly resolve all potential variations, substantially increasing computing cost at inference and training. Furthermore, the lack of interpretability has limited the versatility of the trained models, as the entire models generally need to be trained and re-trained to perform new tasks, as there is generally no intuition as to which portions of the model may be modified to achieve a desired result. As another example, some example approaches which have used interpretable building blocks (e.g., using vocoders) have failed to incorporate them into the training loop, thus generally requiring extensive manual tuning and/or computationally expensive parameter searching.

In contrast, the systems and methods of the present disclosure advantageously integrate the strengths of existing DSP tools by incorporating the DSP elements into the training loop of a machine-learned model. For example, existing DSP elements are generally well-suited for processing signals. Especially with regards to oscillating signals, many DSP elements already have an inductive bias toward resolving oscillating signals. For example, many DSP elements are derived from and/or are based on intrinsic properties of signals in the frequency domain. As such, when a differentiable DSP element, or DDSP element (e.g., DDSP model/processor), is incorporated within the training loop of a machine-learned model, the model can quickly learn to process a signal using the DDSP element without first having to learn (or worse, failing to learn) the intrinsic governing properties of the signals being processed.

Additionally, machine-learned DDSP elements (e.g., DDSP models/processors) may be, in some embodiments, sufficiently interpretable to be deployed in a variety of runtime systems after being trained in a training system. For example, a training system may control one or more DDSP elements to achieve a desired output signal from an input signal. Based on a comparison of the output signal to the input signal, the training system may determine a loss to be backpropagated through the DDSP elements and the training system for updating one or more values of the training system and/or the DDSP elements. Once trained, the machine-learned DDSP elements may, in some cases, be controlled by a runtime system different from the training system. The runtime system may, in some cases, provide an input to the machine-learned DDSP elements to achieve a desired output without needing to further train the machine-learned DDSP elements (although, in some embodiments, the runtime system may optionally conduct further training).

Systems and methods of the present disclosure convey a number of technical effects and benefits. For example, systems and methods of the present disclosure enable digital signal processing to be implemented and applied more quickly by training model(s) using DDSP elements instead of manually selecting parameters for traditional DSP elements. More particularly, the differentiable nature of the DDSP elements enable the model(s) to be trained using powerful and efficient gradient-based training methods (e.g., backpropagation), which enable the systems and methods of the present disclosure to achieve good performance with fewer and less computationally expensive training cycles. Furthermore, the inductive bias of DDSP elements toward oscillating signals permits the training thereof with less training data, as the models do not need to learn to approximate the basic governing relationships of oscillating signals; in some embodiments, the systems and methods of the present disclosure are naturally predisposed to resolve oscillating signals. Associated benefits with the decrease in training data include decreased energy costs (e.g., for processing, for storage), decreased transmission costs (e.g., for communication to/from devices; to/from storage and/or processing components), and the like.

Additionally, in some embodiments, systems comprising the machine-learned DDSP elements may be trained on one training system or device for deployment and/or use at runtime on another runtime system or device that need not conduct further training iterations. For instance, the machine-learned DDSP elements may be trained to compute a desired transformation of an input signal based on iterative training on a training system. Once trained, one or more of the individual DDSP elements may be stored or otherwise integrated into another runtime system or device to directly produce the desired transformation. In some examples, the improved interpretability of the DDSP elements of the present disclosure (e.g., as compared to prior neural-network waveshaping methods) permits the machine-learned DDSP elements of the present disclosure to be rearranged and combined in different configurations to achieve a desired effect without needing to retrain the system as a whole (e.g., incurring additional computational expense). In this manner, systems and methods of the present disclosure may provide for improved performance and decreased energy usage on resource-constrained devices (e.g., end user devices, such as mobile devices).

With reference now to the Figures, example embodiments of the present disclosure will be discussed in further detail.

FIG. 1 depicts an example machine-learned DDSP system 1a according to the present disclosure. The system 1a includes a training source signal 2a, which is desired to be transformed into an output signal 3 by DDSP element(s) 10. The DDSP element(s) 10 receive control inputs from the training control model(s) 20a. The error in the transformation is determined by a loss 4, which is based on a comparison of the training source 2a, the output 3, and a desired relationship therebetween. The loss may be backpropagated through the system 1a from the output 3, through the DDSP element(s) 10, and through the training control model(s) 20a. In this manner, one or more parameters of the DDSP element(s) 10 and/or the training control model(s) 20a may be updated based on the backpropagation of the loss 4.

In some examples, the loss 4 may be determined according to point-wise comparison (e.g., a reconstruction loss). However, for some applications (e.g., audio waveforms), point-wise loss on the raw waveform may not fully reflect the effective difference between two waveforms. For example, in the audio context, two perceptually identical audio samples may have distinct waveforms, and point-wise similar waveforms may sound very different. Thus, some embodiments include a loss 4 which comprises a multi-scale spectral loss. One example embodiment of a multi-scale spectral loss follows. Given two waveforms, the magnitude spectrograms for each may be represented as $S_{1,i}$ and $S_{2,i}$, respectively, with a given FFT size i. The loss 4 may be defined as shown in Equation (1).

$$L_i = \|S_i - \hat{S}_i\|_1 + \alpha \|\log S_i - \log \hat{S}_i\|_1 \quad (1)$$

In Equation (1), the parameter a corresponds to a weighting parameter. A weighting parameter of 1 corresponds to an unweighted sum of the multiple distance scales. In some examples, additional losses may be defined in terms of different outputs and parameters. For example, a loss 4 may include a signal-to-noise ratio parameter defined to penalize outputs with too much noise if it is known that the training data consists of mostly clean data.

In some examples, after training with the training control models 20a, the DDSP elements 10 may receive control inputs from a runtime control system 1b. The runtime control system 1b may include a runtime source 2b, which may be the same or different as the training source 2a. Likewise, the runtime control model(s) 20b may be the same or different as the training control model(s) 20a. In one example, the runtime source 2b is different from the training source 2a, and the runtime control model(s) 20b may generate control inputs for the DDSP elements 10 based on features of the runtime source 2b for producing the output 3. In some cases, depending on whether the runtime control model(s) 20b are the same or different from the training control model(s) 20a, the output 3 may combine features of the runtime source 2b and the training source 2a. In some examples, the runtime control model(s) 20b and/or the DDSP elements 10 may incorporate one or more latent representations of feature(s) extracted from the training source 2a. In some examples, feature(s) extracted from the training source 2a may thereby be mapped onto or otherwise incorporated into the processing of the runtime source 2b for producing a desired output 3.

In some examples, after training of the machine-learned DDSP elements 10, the DDSP elements 10 may be stored or otherwise made accessible to a device containing the runtime control system 1b. For example, the machine-learned DDSP elements 10 may be stored directly for control by the runtime control system 1b, or in some cases, the machine-learned DDSP elements 10 may be used to generate reference data (e.g., look-up tables, wavetables) for approximation of the desired signal transformations without requiring direct computation by the machine-learned DDSP elements 10 on-device. For example, a device operating the runtime control system 1b may reference the reference data (e.g., in local storage and/or via access to remote storage) corresponding to the machine-learned DDSP elements 10 to achieve a desired transformation of a runtime source 2b. In some implementations, all or some portion of the training control model(s) 20a can be used (e.g., on the same or a different device or system) as the runtime control model(s) 20b.

Aspects and advantages of machine-learned DDSP systems may be better understood in view of the following example embodiment of a waveform synthesizer. In some examples, systems and methods according to the present disclosure contain models employing DDSP components that are capable of generating high-fidelity signals (e.g., audio) without autoregressive or adversarial losses.

Embodiments of systems and methods according to the present disclosure may be used, in some examples, for the reconstruction of signals. For instance, a reference signal may be encoded or stored at a reference sample rate or bitrate, and it may be desired to encode or store the signal at a different sample rate and/or bit depth. For example, instead of interpolating between the fixed data points of the reference signal to increase the apparent sample rate, embodiments according to the present disclosure may be used to reconstruct the reference signal by generating a synthesized version thereof, and the synthesized version may be sampled at the desired sample rate. By learning to synthesize the reference signal, signal information at locations between the original sample points of the reference signal can be directly obtained from the learned model instead of interpolated. In this manner, for example, reference signals may be represented (e.g., stored or transmitted) in a compact form using less data (and with lower associated energy costs), while still allowing a higher-fidelity signal to be reconstructed therefrom (e.g., by an end-user device, etc.). In a similar manner, if a different (e.g., lower) bitrate representation of a reference signal is desired, embodiments according to the present disclosure may be used, for example, to learn compact (e.g., compressed) representations with minimal perceived quality loss (e.g., a minimum loss 4, such as a perceptual loss 4). For example, embodiments of the present invention provide for machine-learned parametric audio encoding. For instance, a DDSP element 10 comprising a parameterized synthesizer may be used, and the input parameters of the synthesizer may be generated by a control model 20a, 20b in order to minimize a loss 4. In some examples, the control models 20a, 20b can learn to control the synthesizer to generate a reference signal 2a using a low or the lowest number of input parameters while minimizing the loss 4, such that the reference signal 2a can be represented with a desired fidelity using a decreased number of parameters (e.g., a decreased bitrate).

It is to be understood, however, that the machine-learned DDSP elements of the present disclosure may be used in substantially any signal processing application. In various embodiments, the interpretability and modularity of these models enable: independent control over pitch and loudness during synthesis; realistic extrapolation to pitches not seen during training; blind dereverberation of audio through separate modelling of room acoustics; transfer of extracted room acoustics to new environments; timbre transfer between disparate sources (e.g., converting a singing voice into a violin); and smaller network sizes than prior approaches to neural synthesizers.

It is to be further understood that the machine-learned DDSP elements of the present disclosure are not limited to waveform synthesis applications. For example, the machine-learned DDSP elements of the present disclosure may be used for signal filtering, conditioning, compression, encryption, parametric equalization, synthesis, de-noising, spectral morphing, time stretching, pitch shifting, source separation, audio transcription, etc. In some examples, the systems and methods of the present disclosure may comprise any variety of DDSP elements, including examples selected from a linear time-varying filter, a linear time-invariant filter, a finite impulse response filter, an infinite impulse response filter, an oscillator, a short-time Fourier transform, a parametric equalization processor, an effects processor, an additive synthesizer, a subtractive synthesizer, and a wavetable synthesizer.

Figure 2:
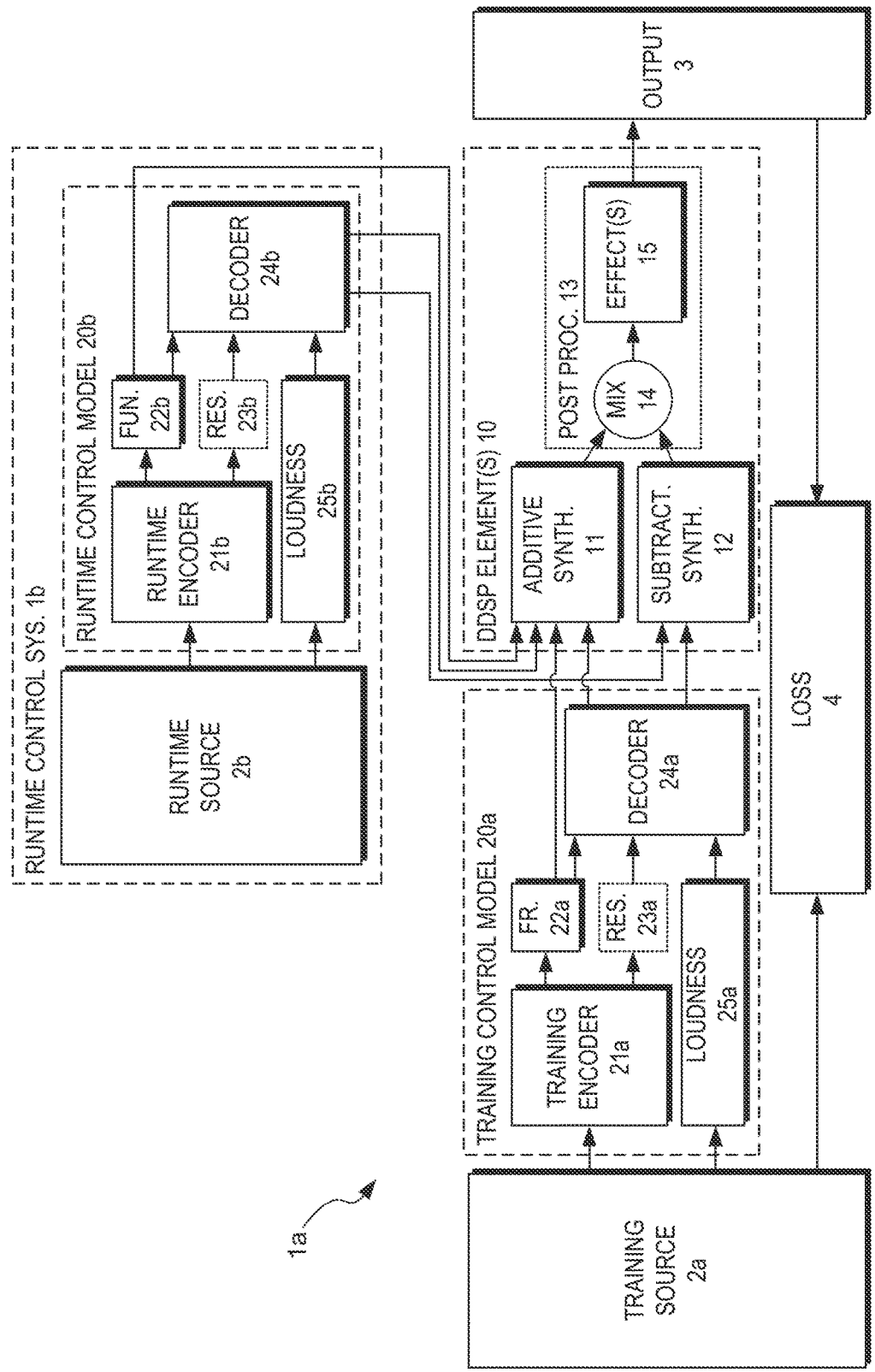
FIG. 2 depicts a block diagram of another example computing device that performs digital signal processing according to additional example embodiments of the present disclosure.

In one example, as shown in FIG. 2, DDSP element(s) 10 comprise an additive synthesizer 11 (e.g., which adds together a plurality of sinusoids) and a subtractive synthesizer 12 (e.g., filtering a noise source). In some examples, the additive synthesizer 11 is a harmonic synthesizer, which generates a weighted sum of sinusoids which are integer multiples of a fundamental frequency $f_0$. The additive synthesizer 11 and the subtractive synthesizer 12 may advantageously be highly expressive of arbitrary waveforms, and the parametrization remains inductively biased toward the expression of oscillating waveforms, as the additive synthesizer's parameterization can be confined to expressing a weighted sum of oscillating waveforms.

For example, one example of a sinusoidal oscillator for the additive synthesizer 11 may be expressed as follows in Equation (2), in which a summed bank of K oscillators outputs a signal x(n) over discrete time steps n.

$$x(n) = \sum_{k=1}^{K} A_k(n)\sin(\phi_k(n)) \quad (2)$$

In Equation (2), $A_k$ (n) is the time-varying amplitude of the k-th sinusoidal component and $\phi_k$ (n) is the instantaneous phase. The phase $\phi_k$ (n) is obtained by integrating (or the corresponding discrete sum) the instantaneous frequency $f_k$ (n) from the initial time n=0 to n, as shown in discrete form in Equation (3).

$$\phi_k(n) = 2\pi \sum_{m=0}^{n} f_k(m) + \phi_{0,k} \quad (3)$$

In Equation (3), $\phi_{0,k}$ (n) is the initial phase that can be randomized, fixed, and/or learned.

In some examples, K is a fixed hyperparameter. However, in some examples, K is a learnable parameter. For instance, embodiments are contemplated in which K is learned in order to generate a compact (e.g., compressed, decreased sample rate, decreased sample bit depth, decreased bitrate) representation of a reference signal.

In some examples, the frequency of the k-th sinusoid (e.g., corresponding to the phase $\phi k$) is associated with a scaling factor $b_k$ relative to the fundamental frequency $f_0$, where the frequency $f_k$ (n)=$b_k$ $f_0$ (n). Some embodiments may provide for the learning of which values of $b_k$ correspond to the sinusoidal components having the greatest influence on the perceived signal quality. In some embodiments, some values of $b_k$ may be identified to correspond to sinusoidal components having negligible effect on the perceived signal quality, which may be omitted to provide a more compact representation. In some embodiments, one or more (or all) of the values of $b_k$ may be integers; in some examples, one or more (or all) of the values may be contiguous integers, although it is contemplated that at least some of the values of $b_k$ may not be contiguous.

For a harmonic oscillator, all the sinusoidal frequencies are harmonic (e.g., positive integer) multiples of a fundamental frequency $f_0$ (n) (e.g., $b_k$=k, giving $f_k$ (n)=k $f_0$ (n)), although inharmonicity may also be included in some examples using oscillators which do not constrain multiples of the fundamental to be integer multiples. Thus, the output of the harmonic oscillator is parameterized by the time-varying fundamental frequency $f_0$ (n) and harmonic amplitudes $A_k$ (n). To aid interpretability, the harmonic (and/or inharmonic) amplitudes may be factorized according to Equation (4).

$$A_k(n)=A(n)c_k(n) \quad (4)$$

In Equation (4), a global amplitude A(n) controls the loudness and a normalized distribution over each harmonic $c_k$ (n). The distribution over harmonics $c_k$ (n) determines spectral variations, where $$\sum_{k=0}^{K} c_k(n) = 1, c_k(n) \geq 0. \quad (5)$$

In some examples, a nonlinearity of the training control model 20a and/or the runtime control model 20b can constrain the amplitudes and harmonic distribution components to be positive (e.g., using a modified sigmoid nonlinearity).

In some implementations, it may be desirable to operate the training control model 20a and/or the runtime control model 20b at a sample and/or frame rate slower than the sample rate of the desired input/output waveform. For instance, the training control model 20a and/or the runtime control model 20b may produce control inputs for the additive synthesizer 11 and/or the subtractive synthesizer 12 based on a selected frame extracted from the training source 2a and/or the runtime source 2b. For instantaneous upsampling (e.g., frequency upsampling), some examples may employ bilinear interpolation between the control inputs for synthesizing the waveform within each frame of the output 3. In some examples, the amplitudes and harmonic distributions for input to the additive synthesizer 11 may be smoothed to reduce artifacts. For example, a smoothed amplitude envelope may be applied by adding overlapping Hamming windows at the center of each frame, scaled by the amplitude. For example, a hop size may be half the frame size for 50% overlap (e.g., a time step of 4 ms for an 8 ms frame size). Attention masks may be used, in some examples, to render a lookup (e.g., an interpolative lookup) differentiable for inclusion within a gradient-based training loop.

One example of a subtractive synthesizer 12 includes a linear filter applied to a source waveform (e.g., a rich source of spectral energy, such as a noise source). In some embodiments, interpretability may be increased, and phase distortion may be decreased by generating, with the training control model 20a and/or the runtime control model 20b, control inputs which correspond to the impulse responses of linear-phase filters. For example, a frequency sampling method may be used to convert the outputs of the training control model 20a and/or the runtime control model 20b into impulse responses of linear-phase filters.

For example, a control model (e.g., the training control model 20a and/or the runtime control model 20b) may predict the frequency-domain transfer functions of a finite impulse response (FIR) filter for every output frame. In particular, the control model may output a vector $H_l$, and accordingly, the inverse discrete Fourier transform may be used to recover the time-domain impulse response $h_l=\text{IDFT}(H_l)$ for the l-th frame of the output. $H_l$ may be interpreted as the frequency-domain transfer function of the corresponding FIR filter. Thus, the FIR may vary in time (e.g., by frame l). To apply the linear time-varying (LTV) FIR filter to an input waveform, the input waveform may be divided into non-overlapping frames $x_l$ to match the impulse responses $h_l$. Frame-wise convolution may then be performed via multiplication of frames in the Fourier domain, e.g., $Y_l=H_lX_l$, where the frames are transformed using the discrete Fourier transform, where $X_l=\text{DFT}(x_l)$ and $Y_l=\text{DFT}(y_l)$ is the output. The frame-wise filtered waveform can be recovered with the inverse discrete Fourier transform, e.g., $y_l=\text{IDFT}(Y_l)$, and then the resulting frames may be overlap-added with the same hop size and window (e.g., rectangular window) used to originally divide the input audio. The hop size may be given by dividing the input waveform into equally spaced frames for each frame of conditioning.

In some examples, the output of the control model (e.g., the training control model 20a and/or the runtime control model 20b) is not used directly as Hi. In some examples, a window function W (e.g., Hann window) is applied to the output of the control model (e.g., the control inputs) to compute Hi. The shape and size of the window can be decided independently to control the time-frequency resolution trade-off of the filter. In some examples, the impulse response is shifted to zero-phase (symmetric) form before applying the window and reverted to causal form before applying the filter.

As shown in FIG. 2, the respective outputs of the additive synthesizer 11 and the subtractive synthesizer 12 may be combined in a post processor 13, which may include a mixer 14. For example, natural sounds can contain both harmonic and stochastic components. Combining and/or mixing the output of an additive synthesizer 11 with a stream of filtered noise, e.g., from a subtractive synthesizer 12, may provide a combined output which is highly expressive of sound or audio recordings. For example, a differentiable filtered noise synthesizer according to aspects of the present disclosure may be implemented by applying the LTV-FIR filter from above to a stream of uniform noise $Y_l=H_lN_l$, where $N_l$ is the IDFT of uniform noise (e.g., in domain [−1, 1]).

The post processor 13 may also include an effect(s) processor 15. For example, room reverberation ("reverb") is one characteristic of realistic audio. A realistic room impulse response (IR) can be as long as several seconds, in some examples, which corresponds to large convolutional kernel sizes, depending on the sample rate of the desired input and/or output waveform (e.g., 10-100 k timesteps). Since convolution via matrix multiplication generally scales as $O(n^3)$, the computational cost may be large for processing during training and/or runtime when reverb is applied in the time domain. In some implementations, the effects processor 15 performs convolution as multiplication in the frequency domain, which scales as $O(n \log(n))$ and presents generally lower computational costs (e.g., so as to avoid creating a bottleneck during runtime and/or training).

Prior approaches to modelling room reverb have implicitly simulated/synthesized the reverb effect. However, in contrast, embodiments of systems and methods of the present disclosure gain interpretability by explicitly factorizing the room acoustics post-synthesis using a DDSP element contained within the training loop of the training control model 20a. In this manner, the effects processor 15 may be trained to transform the output of the additive synthesizer 11 and the subtractive synthesizer 12 (e.g., mixed by the mixer 14 into a mixed waveform) by adding reverberation. Because of the inductive bias of the DDSP elements 10, the resulting machine-learned DDSP elements 10 after training may comprise interpretable functions for versatile usage. For instance, an effects processor 15 may be trained using a training source 2a. The effects processor 15 may include a reverberation model as described herein, wherein the reverberation model contains one or more parameters and/or coefficients learned via backpropagation of a loss 4 determined by comparison of the output 3 and the training source 2a. The effects processor 15 can learn to introduce a synthesized reverberation into the mixed waveform for producing an output 3 which shares reverberation characteristics with the training source 2a. In some embodiments, when application of the reverberation effect is concentrated in application by the effects processor 15, the additive synthesizer 11 and the subtractive synthesizer 12 learn to jointly synthesize a de-reverberated version of an input waveform (e.g., a training source 2a and/or a runtime source 2b).

In some embodiments, an effects processor trained with a training source 2a may correspond to and/or embed an acoustic feature of the training source 2a (e.g., a spatial acoustic response, such as reverb) in learned coefficients associated therewith. The trained effects processor 15 may then be used to apply the feature to another waveform (e.g., a runtime source 2b). For example, after training of the DDSP elements 10, a runtime control system 21 may process a runtime source 2b to provide control inputs to the DDSP elements 10. The runtime control model 20b may, in some cases, have been previously trained as described herein with respect to the training control model 20a, such that the runtime control model 20b provides control inputs to the additive synthesizer 11 and the subtractive synthesizer 12 which cause the additive synthesizer 11 and the subtractive synthesizer 12 to produce outputs which are mixed in the mixer 14 to form a mixed waveform corresponding to a de-reverberated version of the runtime source 2b. The effects processor 15, having been trained to provide a reverberation effect to correspond to the training source 2a, may then transform the de-reverberated version of the runtime source 2b to possess the reverberation associated with the training source 2a. For example, a training source 2a may be an audio source recorded in a concert hall, and the runtime source may be an audio source recorded at home, such as in an office or living room. By applying the reverberation effect associated with the concert hall recording to the de-reverberated version of the home recording, the home recording may be perceived as having been recorded in the concert hall.

Advantageously, the above removal and/or transplant of reverberation characteristics may be accomplished by systems and methods of the present disclosure in a "blind" fashion, for example, using only reverberated audio sources, without a need for dedicated measurements of impulse responses in the target and/or source reverberation environments, or directly-recorded samples of audio without reverberation. Thus, the interpretability of the systems and methods of the present disclosure directly contributes to the efficient (e.g., energy efficient due to decreased computational requirements) methods of audio de-reverberation and reverberation modification proposed herein.

The training control model 20a and/or runtime control model 20b may be any suitable choice of trainable model (e.g., generative adversarial network (GAN), variational autoencoder (VAE), Flow, etc.). In some embodiments, an autoencoder (e.g., deterministic autoencoder) may be used as the training control model 20a and/or runtime control model 20b. In some examples, DDSP components can dramatically improve autoencoder performance in the audio domain. In some examples, stochastic latents may be used (such as in GAN, VAE, and Flow models). In one example of an autoencoder, an encoder network $f_{enc}(\cdot)$ maps the input x to a latent representation and a decoder network $f_{dec}(\cdot)$ attempts to directly reconstruct the input x from the latent representation as $x_{recon} = f_{dec}(z)$.

For example, an encoder (e.g., training encoder 21a, runtime encoder 21b) may include a subcomponent which processes the input source to extract a loudness metric 25a/25b. The encoder may also optionally include a subcomponent which explicitly determines frequency data 22a/22b corresponding to the input source (e.g., fundamental frequency $f_0$; optionally harmonics $c_k$) as a function of time, frame, and/or sample no, although it is contemplated that, in some examples, the frequency data 22a/22b may be implicitly learned by a decoder (e.g., decoder 24a, decoder 24b). In some examples, a pretrained CREPE model with fixed weights is used to extract the fundamental frequency $f_0$. In some examples, the encoder (e.g., training encoder 21a, runtime encoder 21b) comprises a Resnet architecture used to extract the fundamental frequency $f_0$ from a mel-scaled log spectrogram one or more frames of the input source.

In some embodiments, an encoder (e.g., training encoder 21a, runtime encoder 21b) optionally learns a latent residual representation 23a/23b of the input source (e.g., encoding characteristics other than loudness and/or the fundamental frequency; may also be a function of time, sample, and/or frame no.). For example, mel-frequency cepstral coefficients (MFCC) may be extracted from the input source, optionally normalized, and input into an input layer of the encoder (e.g., training encoder 21a, runtime encoder 21b). The MFCC may correspond to the smoothed spectral envelope of harmonics. In this manner, the latent residual representation may learn and/or embed tonal characteristics of the input source (e.g., timbre).

In some examples, a decoder (e.g., decoder 24a, decoder 24b) comprises a neural network which receives frequency data 22a/22b, loudness 25a/25b, and optionally the residual 23a/23b as inputs and generates control inputs for the DDSP element(s) 10 (e.g., including the additive synthesizer 11 and the subtractive synthesizer 12).

In this manner, the interpretable characteristics of fundamental frequency 22a/22b, loudness 25a/25b, and optionally a latent residual 23a/23b (e.g., capturing residual information, such as tone and/or timbre) may each be processed and/or embedded by various components of the control model (e.g., training control model 20a and/or runtime control model 20b). As discussed above with respect to the effects processor 15, the fundamental frequency 22a, latent residual representation 23a, and/or loudness 25a may be substituted (e.g., with fundamental frequency 22b, latent residual representation 23b, and/or loudness 25b) and/or manipulated to obtain a desired effect on the output 3. For example, a training control model 20a may be trained to learn the fundamental frequency 22a, latent residual representation 23a, and/or loudness 25a corresponding to a training source 2a (e.g., as well as the effect(s) learned by the effect(s) processor 15). After training, a runtime control system 21 may substitute and/or modify at least one of the fundamental frequency 22b, latent residual representation 23b, and/or loudness 25b as a control input to the decoder 24a and/or the DDSP elements 10, thereby synthesizing an output 3 that blends the characteristics of the training source 2a and the runtime source 2b.

For example, a training source 2a may comprise a recording of, e.g., a musical instrument, such as a violin. Through iterative backpropagation, as described herein, the training control system 20a and DDSP elements 10 may learn latent representations of acoustic features of the violin recording (e.g., loudness, tone, timbre, reverberation, etc.). One or more latent representations may be explicitly learned (e.g., in a latent residual 23a) and/or implicitly learned (e.g., implicitly within the training decoder 24a). A runtime source 2b may contain a recording of another musical source, e.g, a singing voice, and a runtime encoder 21b may extract $f_0$ 22b and loudness feature 25b therefrom. The runtime decoder 24b may optionally be configured to be the same as the training decoder 24a, such that the control inputs for the DDSP elements 10 generated by the runtime decoder 24b cause the DDSP elements 10 to generate an output 3 which corresponds to the $f_0$ 22b and loudness feature 25b of the singing voice recording while also corresponding to the remaining acoustic features (e.g., tone, timbre, reverberation, etc.) of the violin recording—for example, the violin may be perceived as playing the tune sung by the singing voice. In some examples, the features extracted from the singing voice may be additionally modified for integration with the acoustic features of the violin prior to processing by the runtime decoder 24b; for example, the fundamental frequency may be scaled, such as to better integrate with the natural and/or expected register of the violin. In some examples, the room acoustics (e.g., spatial acoustic response, such as reverberation) of the violin recording may be transferred to the singing voice recording (e.g., as described above) to synthesize a singing voice recording with the violin recording reverberation, and the loudness feature 25b may then be extracted from the singing voice recording with the violin recording reverberation, to better integrate with the loudness contours used to train the latent representations of the violin acoustic characteristics. In this manner, a synthesized output audio may be obtained which captures many subtleties of the singing voice with the timbre and room acoustics of the violin recording.

Additionally, embodiments of the present disclosure provide an interpretable structure which allows for independent control over generative factors. Each component of the factorized latent variables (e.g., frequency data 22a/22b, loudness 25a/25b, and optionally a residual 23a/23b) can independently alter samples along a matching perceptual axis. For example, with other variables held constant, loudness of the synthesized audio (e.g., output 3) can be independently manipulated by adjusting the loudness input 25a/25b. Similarly, the fundamental frequency data of the synthesized audio (e.g., output 3) can be independently manipulated by adjusting the frequency data 22a/22b. Additionally, in embodiments which encode a latent residual 23a/23b, the timbre of the synthesized output (e.g., output 3) can be independently manipulated by adjusting the latent residual encoding 23a/23b.

Furthermore, embodiments of the present disclosure can provide a disentangled representation which may interpolate within and extrapolate outside the training data distribution. For example, as shown in FIG. 2, frequency data 22a/22b, such as the fundamental frequency $f_0$ (e.g., as a function of time/sample no./frame no.), may be input directly to the DDSP elements 10, such as directly to the additive synthesizer 11. The latent representation of the fundamental frequency can have structural meaning for the synthesizer outside the context of any given dataset. In some embodiments, the frequency data (e.g., $f_0$) is modified (e.g., scaled, shifted, etc.) prior to inputting to the additive synthesizer 11 as a control input but remains unmodified for inputting to the decoder 24a/24b.

Example Devices and Systems

Figure 3:
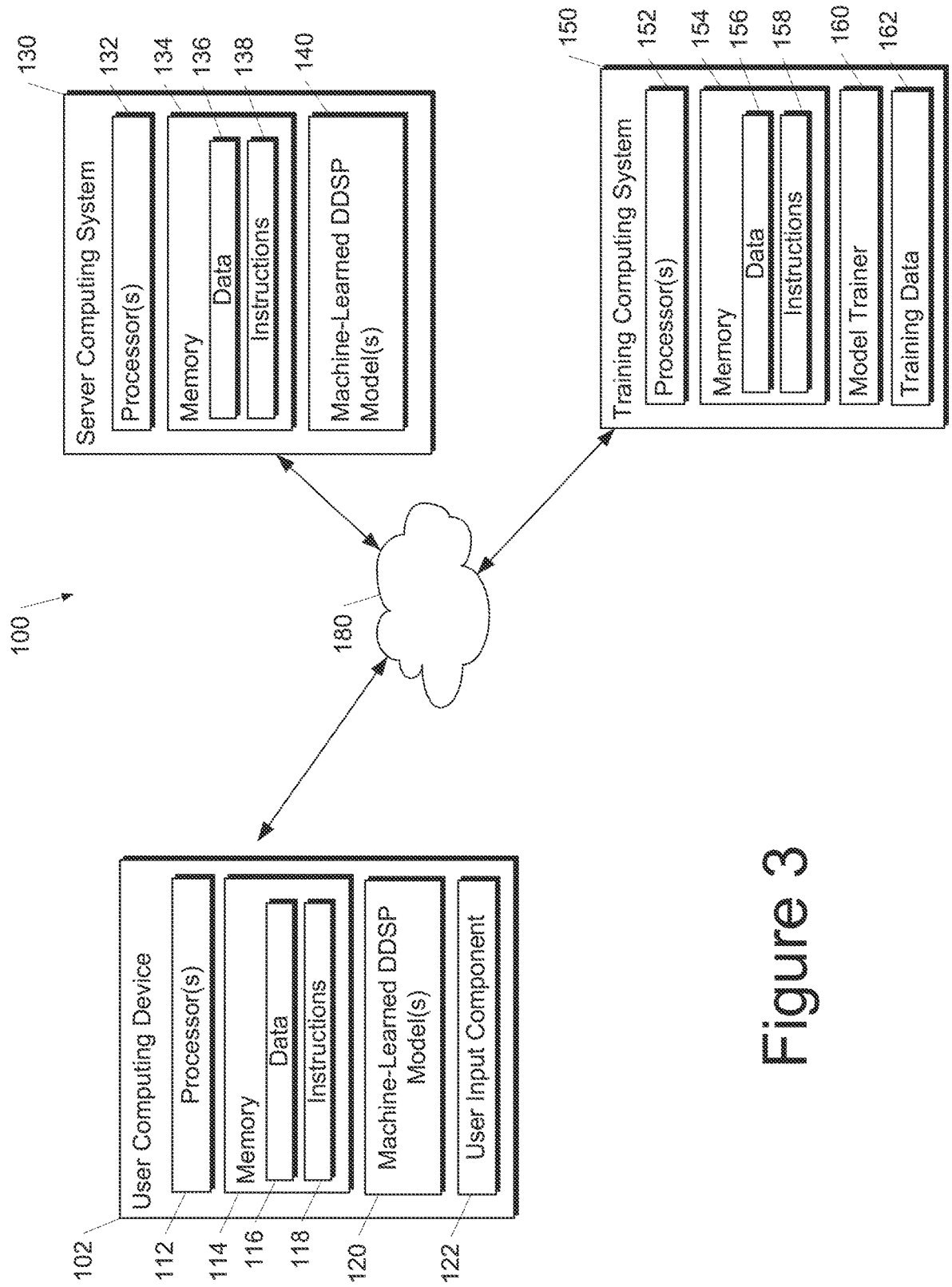
FIG. 3 depicts a block diagram of an example machine-learned differentiable digital signal processing model according to example embodiments of the present disclosure.

FIG. 3 depicts a block diagram of an example computing system 100 that performs digital signal processing using machine-learned differentiable digital signal processors according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned DDSP models 120. For example, the machine-learned DDSP models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned DDSP models 120 are discussed with reference to FIGS. 1-5.

In some implementations, the one or more machine-learned DDSP models 120 can be received from the server computing system 130 over network 180, stored in the user computing device memory 114, and then used or otherwise implemented by the one or more processors 112. In some implementations, the user computing device 102 can implement multiple parallel instances of a single machine-learned DDSP model 120 (e.g., to perform parallel digital signal processing across multiple instances and/or with multiple signals).

Additionally or alternatively, one or more machine-learned DDSP models 140 can be included in or otherwise stored and implemented by the server computing system 130 that communicates with the user computing device 102 according to a client-server relationship. For example, the machine-learned DDSP models 140 can be implemented by the server computing system 140 as a portion of a web service (e.g., a digital signal processing service, such as an audio processing, synthesis, and/or transformation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, camera, analog and/or digital audio input (e.g., for connection with external recording equipment), a traditional keyboard, or other means by which a user can provide user input. For example, the touch-sensitive component can serve to implement a simulated musical instrument, such as a keyed instrument, a digital synthesizer, and the like.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned DDSP models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. In some examples, the loss comprises a multi-scale spectral loss determined between two waveforms. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned DDSP models 120 and/or 140 based on a set of training data 162. The training data 162 can include, for example, sound recordings, such as music, speech, and/or other audio recordings. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 3 illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

For example, the machine learned DDSP model(s) 140 may be implemented as a service over the network 180. For example, the user computing device 102 may record and/or transmit a source (e.g., a training source and/or a runtime source) over the network 180 to the server computing system 130 for processing with the machine-learned DDSP model(s) 140. In some embodiments, the user computing device trains models 120 locally (e.g., using sources stored and/or streamed locally) and uploads trained machine-learned models 140 to a server computing system 130. For instance, the trained machine-learned models 140 may include latent representations of acoustic features of the source(s) recorded by the user computing device 102, such as an effects processor (e.g., a reverberation effect processor) trained to simulate a reverberation associated with the source(s) from the user computing device 102. In this manner, the server 130 may collect and/or maintain a library of machine-learned DDSP model(s) 140 for use thereon and for distribution to multiple other user computing devices 102.

In one embodiment, a user computing device 102 trains a machine-learned DDSP model 120 locally with a first source, and a user desires to apply an effect associated with a second source to the first source material. A library of machine-learned DDSP models 140 on the server 130 may be available for the user to download one or more trained machine-learned DDSP models 140 for applying a desired effect. In some examples, the user may download only the machine-learned DDSP element(s) associated with the desired operation(s). For instance, a user may download an effects processor (e.g., data descriptive thereof) for providing an effect that the effect processor was trained to apply (e.g., a reverberation effect corresponding to a particular room and/or room response characteristic).

Figure 4:
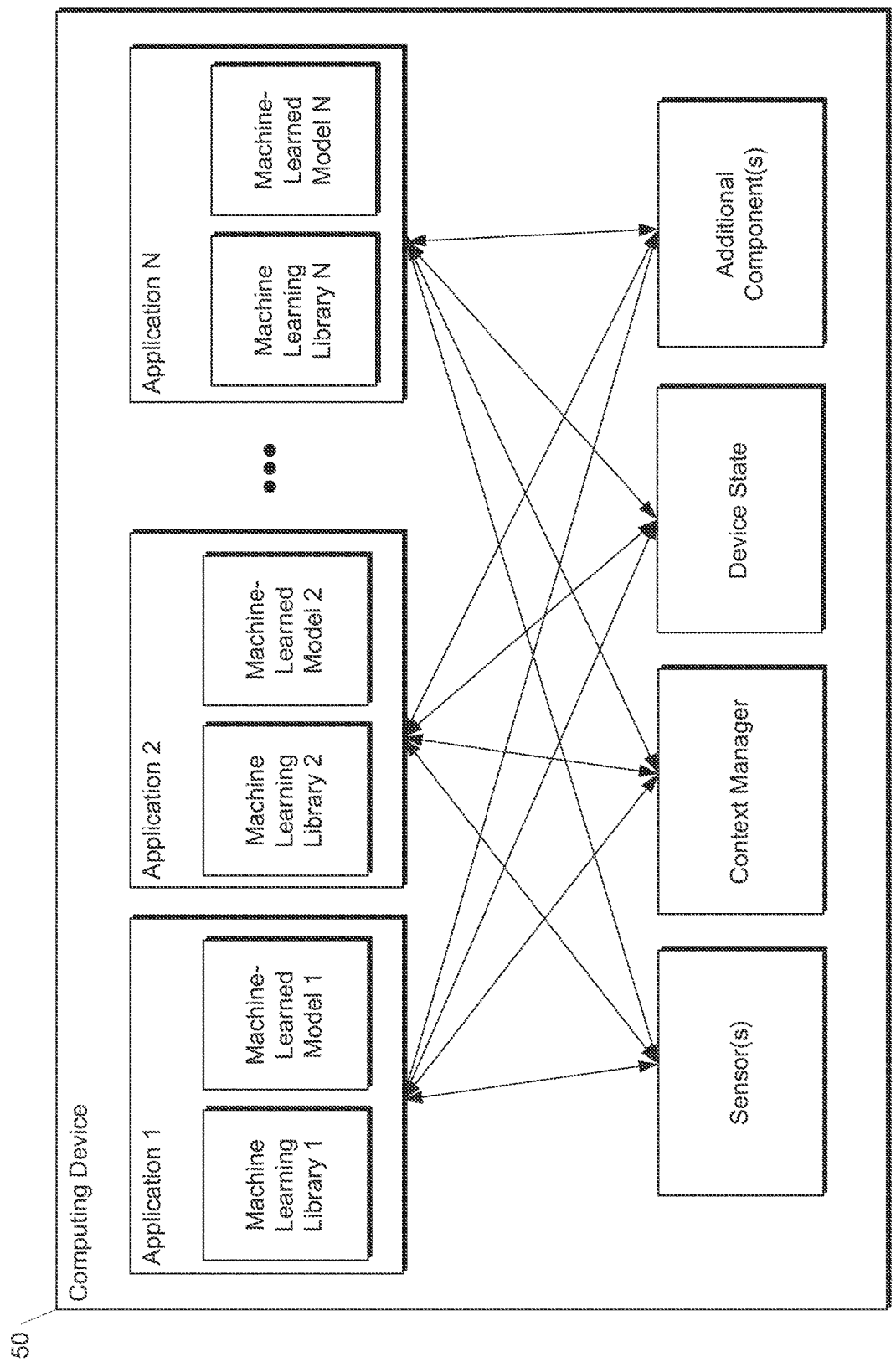
FIG. 4 depicts a block diagram of an example machine-learned differentiable digital signal processing model according to example embodiments of the present disclosure.

FIG. 4 depicts a block diagram of an example computing device 50 that performs according to example embodiments of the present disclosure. The computing device 50 can be a user computing device or a server computing device. The computing device 50 includes a number of applications (e.g., applications 1 through N). Each application contains its own machine learning library and machine-learned model (s). For example, each application can include a machine-learned model. Example applications include a text messaging application, an email application, a dictation application, a virtual keyboard application, a browser application, etc.

Figure 5:
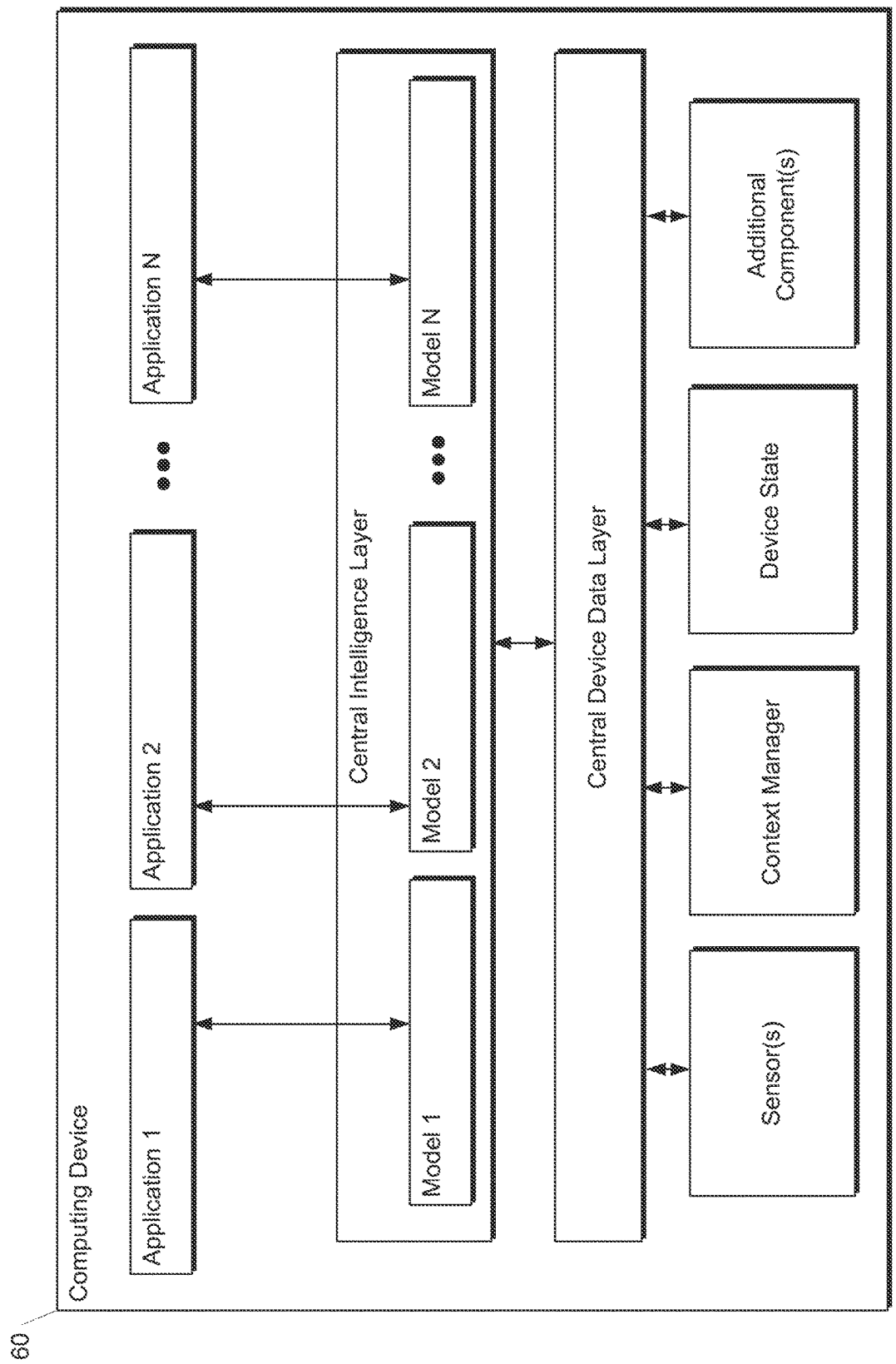
FIG. 5 depicts a block diagram of an example machine-learned differentiable digital signal processing model according to example embodiments of the present disclosure.

As illustrated in FIG. 5, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

FIG. 5 depicts a block diagram of an example computing device 60 that performs according to example embodiments of the present disclosure. The computing device 60 can be a user computing device or a server computing device. The computing device 60 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 60.

The central intelligence layer can communicate with a central device data layer. The central device data layer can be a centralized repository of data for the computing device 60. As illustrated in FIG. 5, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

In some examples, the machine-learned DDSP models of the present disclosure may be trained using supervised and unsupervised training techniques. For the example embodiments discussed below, two different musical datasets were used: NSynth and a collection of solo violin performances. By way of demonstration, an autoencoder structure was used for the following tests. The supervised DDSP model was conditioned on fundamental frequency $f_0$ and loudness features extracted from the audio, while the unsupervised DDSP model learned $f_0$ jointly with the rest of the network.

A subset of NSynth includes 70,379 examples comprised mostly of strings, brass, woodwinds and mallets with pitch labels within MIDI pitch range 24-84. An 80/20 train/test split was employed with shuffling across instrument families. For the NSynth experiments, the optional latent residual encoder was used, as discussed herein.

Using the MusOpen royalty free music library, 3 minutes of expressive, solo violin performances were collected. Pieces were selected from a single performer (John Garner) that were monophonic and shared a consistent room environment to encourage the model to focus on performance. Like NSynth, audio is converted to mono 16 kHz and divided into 4 second training examples (64,000 samples total). For the solo violin experiments, the supervised variant of the autoencoder was used without the latent residual encoder, and a reverb module was added to the signal processor chain to account for room reverberation. While the room impulse response could be produced as an output of the decoder (i.e., implicitly learned), given that the solo violin dataset has a single acoustic environment, we use a single fixed variable (4 second reverb corresponding to 64,000 dimensions) for the impulse response.

In the present example, the model has three encoders: f-encoder that outputs fundamental frequency f(t), l-encoder that outputs loudness l(t), and a z-encoder that outputs the latent residual vector z(t). A pretrained CREPE pitch detector may be used as the f-encoder to extract ground truth fundamental frequencies ($f_0$) from the audio (e.g., the "large" variant of CREPE). For the supervised autoencoder examples addressed presently, weights of the f-encoder were fixed, and for the unsupervised autoencoder, log mel spectrograms of the audio were input to a Resnet model to jointly learn the weights. Details of the Resnet architecture are shown in Tables 1 and 2.

An example method for extracting loudness features from an input audio source includes A-weighting of the power spectrum, which puts greater emphasis on higher frequencies, followed by log scaling. The vector is then centered according to the mean and standard deviation of the dataset.

An example latent residual encoder 700, shown in FIG. 7A, first calculates MFCCs (Mel Frequency Cepstrum Coefficients) from the audio reference source 702 with an MFCC processor 704. MFCCs are computed from the log-mel-spectrogram of the audio 702 with a FFT size of 1024, 128 bins of frequency range between 20 Hz to 8000 Hz with an overlap of 75%. In this particular example, the first 30 MFCCs are used that correspond to a smoothed spectral envelope. The MFCCs are then passed through a normalization layer 706 (which has learnable shift and scale parameters) and a 512-unit GRU 708. The GRU 708 outputs (over time) fed to a 512-unit linear dense layer 710 to obtain z(t), the latent residual 712. The z embedding of the latent residual 712 reported in this example has 16 dimensions across 250 time-steps.

For the example model architecture for the f(t) encoder using a Resnet on log mel spectrograms, the spectrograms have a frame size of 2048 and a hop size of 512, and are up sampled at the end to have the same time resolution as other the latent encodings (4 ms per frame). All convolutions in this example architecture use the "same" padding and a temporal stride of 1. Each residual block uses a bottleneck structure. The final output is a normalized probability distribution over 128 frequency values (logarithmically scaled between 8.2 Hz and 13.3 kHz). The final frequency value is the weighted sum of each frequency by its probability.

TABLE 1

| Residual Block | $k_{time}$ | $k_{freq}$ | $s_{freq}$ | $k_{filters}$ |
|---|---|---|---|---|
| Layer norm + ReLU | — | — | — | — |
| Conv. | 1 | 1 | 1 | $k_{filters}/4$ |
| Layer norm + ReLU | — | — | — | — |
| Conv. | 3 | 3 | 3 | $k_{filters}/4$ |
| Layer norm + ReLU | — | — | — | — |
| Conv. | 1 | 1 | 1 | $k_{filters}$ |
| Add residual | — | — | — | — |

TABLE 2

| Resnet | Output Size | $k_{time}$ | $k_{freq}$ | $s_{freq}$ | $k_{filters}$ |
|---|---|---|---|---|---|
| LogMelSpectrogram | (125, 229, 1) | — | — | — | — |
| Conv2d | (125, 115, 64) | 7 | 7 | 2 | 64 |
| Max pool | (125, 58, 64) | 1 | 3 | 2 | — |
| Residual block | (125, 58, 128) | 3 | 3 | 1 | 128 |
| Residual block | (125, 57, 128) | 3 | 3 | 1 | 128 |
| Residual block | (125, 29, 256) | 3 | 3 | 2 | 256 |
| Residual block | (125, 29, 256) | 3 | 3 | 1 | 256 |
| Residual block | (125, 29, 256) | 3 | 3 | 1 | 256 |
| Residual block | (125, 15, 512) | 3 | 3 | 2 | 512 |
| Residual block | (125, 15, 512) | 3 | 3 | 1 | 512 |
| Residual block | (125, 15, 512) | 3 | 3 | 1 | 512 |
| Residual block | (125, 15, 512) | 3 | 3 | 1 | 512 |
| Residual block | (125, 8, 1024) | 3 | 3 | 2 | 1024 |
| Residual block | (125, 8, 1024) | 3 | 3 | 1 | 1024 |
| Residual block | (125, 8, 1024) | 3 | 3 | 1 | 1024 |
| Dense | (125, 1, 128) | — | — | 128 | 1 |
| Upsample time | (1000, 1, 128) | — | — | — | — |
| Softplus and normalize | (1000, 1, 128) | — | — | — | — |

The example decoder's input is the latent tuple (f(t), l(t), z(t)) for 250 timesteps. Its outputs are the control inputs to the synthesizers. For example, in the case of an additive harmonic synthesizer and a subtractive filtered noise synthesizer setup, the decoder outputs α(t) (amplitudes of the harmonics) for the harmonic synthesizer (note that, in this example, f(t) is also fed directly from the latent representation), and H (transfer function of the FIR filter) for the filtered noise synthesizer, as described above.

In some implementations, a "shared-bottom" architecture may be used, as shown in FIG. 7B, which computes a shared embedding from the latent tuple (e.g., a fundamental embedding 752, an latent residual 754, and a loudness 756). One head may be used for each of the (α(t), H) outputs (e.g., an additive synthesizer 770 and a subtractive synthesizer 772). In one arrangement, separate MLPs 758a, 758b, 758c may be respectively applied to each of the fundamental embedding 752, the latent residual 754, and the loudness 756. The outputs of the MLPs 758a, 758b, 758c are concatenated in a concatenation layer 760 and passed to a 512-unit GRU 762. The GRU 762 outputs may be concatenated in a concatenation layer 764 with the outputs of the MLPs 758a, 758b corresponding to the fundamental embedding 752 and the latent residual 754 (in the channel dimension) and passed through a final MLP 766 and linear dense layers 768a, 768b to get the decoder outputs for the additive synthesizer 770 and the subtractive synthesizer 772. The MLP architecture (e.g., for any of the MLPs 758a, 758b, 758c, 766) may be a standard MLP architecture with a layer normalization (e.g., tf.contrib.layers.layer_norm) before a RELU nonlinearity. In the present example, all the MLPs 758a, 758b, 758c, 766 have 3 layers and each layer has 512 units.

Because all the DDSP components are differentiable, the model is differentiable end-to-end. Therefore, any SGD optimizer may be used to train the model. The ADAM optimizer was used with learning rate 0.001 and exponential learning rate decay 0.98 every 10,000 steps.

To help guide the DDSP autoencoder that must predict f(t) on the NSynth dataset, an additional perceptual loss was added using pretrained models, such as the CREPE pitch estimator and the encoder of the WaveNet autoencoder. Compared to the $L_1$ loss on the spectrogram, the activations of different layers in these models can, in some examples, correlate better with the perceptual quality of the audio. For example, a combined loss may be used, such as using the $L_1$ distance between the activations of the small CREPE model's fifth max pool layer with a weighting of 5e-5 relative to the spectral loss.

In the present example, 101 harmonics are used in the harmonic synthesizer (i.e., α(t)'s dimension is 101). Amplitude and harmonic distribution parameters are up sampled with overlapping Hamming window envelopes whose frame size is 128 and hop size is 64. Initial phases are all fixed to zero. In the present example, the amplitudes, harmonic distributions, and filtered noise magnitudes are constrained to be non-negative by applying a sigmoid nonlinearity to network outputs, such as the following nonlinearity:

$$y = 2.0 \cdot \text{sigmoid}(x)^{\log 10} + 10^{-7} \quad (6)$$

The filtered noise synthesizer used 65 network output channels as magnitude inputs to the FIR filter.

In the present example, all models are trained on the NSynth dataset except for those marked (Solo Violin). In the present results, autoregressive models have the most parameters with GANs requiring fewer. Some example DDSP models according to the present disclosure can be implemented using 2 to 3 times fewer parameters than GANSynth. The unsupervised model has more parameters because of the CREPE (small) f(t) encoder, and the NSynth autoencoder has additional parameters for the z(t) encoder.

TABLE 3

| Model | Parameters (in millions) |
|---|---|
| WaveNet Autoencoder | 75 |
| WaveRNN | 23 |
| GANSynth | 15 |
| DDSP Autoencoder (unsupervised) | 12 |
| DDSP Autoencoder (supervised, NSynth) | 7 |
| DDSP Autoencoder (supervised, Solo Violin) | 6 |
| DDSP Autoencoder Tiny (supervised, Solo Violin) | 0.24 |

The example DDSP models prepared according to the present disclosure as described in Table 3 above have the fewest parameters (up to 10 times less), even without explicit optimization to minimize the model size for the present examples. Additionally, even the smallest DDSP models (e.g., the DDSP "Tiny" with 240k parameters, 300× smaller than a WaveNet Autoencoder) retain strong audio quality performance, offering substantial computational cost savings for low-latency applications and/or resource-limited applications, such as on CPU or embedded devices.

For the NSynth dataset, we quantitatively compare the quality of DDSP resynthesis with that of a state-of-the-art baseline using WaveRNN (e.g., according to Hantrakul et al., 2019). The models are trained on the same data, provided the same conditioning, and both targeted towards real-time synthesis applications. When reconstruction errors (e.g., $L_1$ distance) are computed for the resynthesized and ground-truth feature vectors (e.g., loudness, fundamental frequency, etc.), the machine-learned DDSP models according to the present disclosure offer substantial accuracy improvements (e.g., up to 5×-20×) over WaveNet, despite using significantly smaller models.

Example Methods

Figure 6:
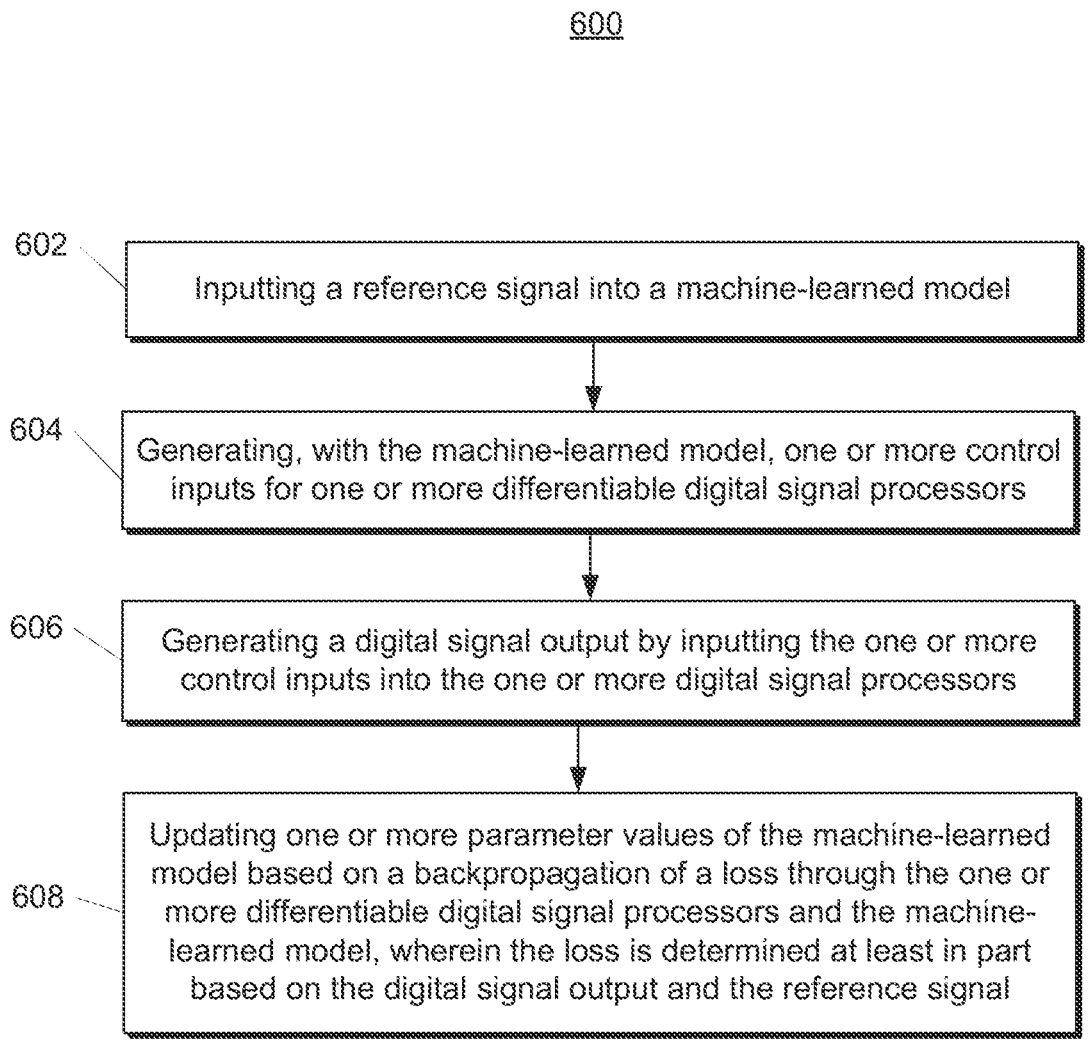
FIG. 6 depicts a flow chart diagram of an example method to perform digital signal processing according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system inputs a reference signal into a machine-learned model. The reference signal may be a training source, for example, and the machine-learned model may include a training control model.

At 604, the computing system generates, with the machine-learned model, one or more control inputs for one or more differentiable digital signal processors.

At 606, the computing system generates a digital signal output by inputting the one or more control inputs into the one or more digital signal processors.

At 608, the computing system updates one or more parameter values of the machine-learned model based on a backpropagation of loss through the one or more differentiable digital signal processors and the machine-learned model. The loss may be determined, at least in part, based on the digital signal output and the reference signal. In some examples, the loss is a spectral loss, such as a multi-scale spectral loss.

In some embodiments, the one or more control inputs comprise a plurality of frequency response descriptors for inputting to an additive synthesizer. In some embodiments, generating the digital signal output comprises generating a plurality of waveforms respectively corresponding to the plurality of frequency response descriptors. In some embodiments, the one or more control inputs comprise one or more parameters of a subtractive synthesizer, and generating the digital signal output further comprises generating a filtered noise waveform using the subtractive synthesizer.

In some embodiments, the method further comprises generating a second digital signal output using runtime control inputs, wherein the runtime control inputs were generated based at least in part on a second reference signal (e.g., a runtime source).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system that combines machine learning with digital signal processors, the computing system comprising:
   one or more processors; and
   one or more non-transitory computer-readable media that collectively store:
      one or more differentiable digital signal processors configured to receive one or more control inputs and to process the one or more control inputs to generate a digital signal output, wherein each of the one or more differentiable digital signal processors is differentiable from the digital signal output to the one or more control inputs;
      a machine-learned model configured to receive a model input and to process the model input to generate the one or more control inputs for the one or more differentiable digital signal processors, wherein the machine-learned model has been trained by backpropagating a loss through the one or more differentiable digital signal processors; and
      instructions that, when executed by the one or more processors, cause the computing system to perform operations, the operations comprising:
         receiving the model input;
         using the machine-learned model to generate the one or more control inputs based on the model input; and
         using the one or more differentiable digital signal processors to generate the digital signal output based on the one or more control inputs.

2. The computing system of claim 1, wherein the one or more differentiable digital signal processors comprises one or more of a linear time-varying filter, a linear time-invariant filter, a finite impulse response filter, an infinite impulse response filter, an oscillator, a short-time Fourier transform, a parametric equalization processor, an effects processor, an additive synthesizer, a subtractive synthesizer, and a wavetable synthesizer.

3. The computing system of claim 2, wherein the one or more differentiable digital signal processors comprises an additive synthesizer and a subtractive synthesizer for generating a synthesized signal.

4. The computing system of claim 3, wherein the additive synthesizer comprises an oscillator and the subtractive synthesizer comprises a linear time-varying filter applied to a noise source.

5. The computing system of claim 3, wherein using the one or more differentiable digital signal processors to generate the digital signal output comprises:
   transforming the synthesized signal with an effects processor of the one or more differentiable digital signal processors to generate a transformed synthesized signal.

6. The computing system of claim 5, wherein the digital signal output comprises an output musical waveform.

7. The computing system of claim 6, wherein transforming the synthesized signal comprises simulating a reverberation effect based on one or more parameters of the effects processor, and wherein the synthesized signal corresponds to a de-reverberated version of the transformed synthesized signal.

8. The computing system of claim 7, wherein the one or more parameters of the effects processor were learned using a first loss based on a first training source, and one or more parameters of the machine-learned model were learned using a second loss based on a second training source.

9. The computing system of claim 2, wherein the machine-learned model comprises an encoder for processing the model input and a decoder for outputting the one or more control inputs.

10. The computing system of claim 2, wherein the loss comprises a spectral loss based at least in part on the digital signal output.

11. The computing system of claim 10, wherein the spectral loss is a multi-scale spectral loss determined between the digital signal output and the model input.

12. A computer-implemented method for training a machine-learned model to generate control inputs for differentiable digital signal processors, the method comprising:
inputting, by a computing system comprising one or more computing devices, a reference signal into a machine-learned model;
generating, by the computing system, and with the machine-learned model, one or more control inputs for one or more differentiable digital signal processors;
generating, by the computing system, a digital signal output by inputting the one or more control inputs into the one or more differentiable digital signal processors; and
updating, by the computing system, one or more parameter values of the machine-learned model based on a backpropagation of a loss through the one or more differentiable digital signal processors and the machine-learned model, wherein the loss is determined at least in part based on the digital signal output and the reference signal.

13. The computer-implemented method of claim 12, wherein the method further comprises updating, by the computing system, one or more parameter values of at least one of the one or more differentiable digital signal processors based on the backpropagation of the loss.

14. The computer-implemented method of claim 12, wherein the one or more differentiable digital signal processors comprises one or more of a linear time-varying filter, a linear time-invariant filter, a finite impulse response filter, an infinite impulse response filter, an oscillator, a short-time Fourier transform, a parametric equalization processor, an effects processor, an additive synthesizer, a subtractive synthesizer, and a wavetable synthesizer.

15. The computer-implemented method of claim 14, wherein the one or more differentiable digital signal processors comprise a harmonic oscillator and a filtered noise generator.

16. The computer-implemented method of claim 15, wherein the filtered noise generator comprises a linear time-varying filter.

17. The computer-implemented method of claim 13, wherein:
the at least one of the one or more differentiable digital signal processors is an effects processor; and
the effects processor is configured to simulate a reverberation associated with the reference signal based at least in part on the one or more parameter values of the effects processor.

18. The computer-implemented method of claim 12, wherein the loss is a multi-scale spectral loss.

19. A computing system, comprising:
one or more processors; and
one or more non-transitory computer-readable media that collectively store instructions that, when executed by the one or more processors, cause the computing system to perform operations, the operations comprising:
inputting a reference signal into a machine-learned model;
generating, with the machine-learned model, one or more control inputs for one or more differentiable digital signal processors;
generating a digital signal output by inputting the one or more control inputs into the one or more differentiable digital signal processors; and
updating one or more parameter values of the machine-learned model based on a backpropagation of a loss through the one or more differentiable digital signal processors and the machine-learned model, wherein the loss is determined at least in part based on the digital signal output and the reference signal.

20. The computing system of claim 19, wherein the one or more differentiable digital signal processors comprises one or more of a linear time-varying filter, a linear time-invariant filter, a finite impulse response filter, an infinite impulse response filter, an oscillator, a short-time Fourier transform, a parametric equalization processor, an effects processor, an additive synthesizer, a subtractive synthesizer, and a wavetable synthesizer.

* * * * *